United States Patent [19]

Reda et al.

[11] 4,419,612

[45] Dec. 6, 1983

[54] SINGLE WORKHEAD ELECTRO-MECHANICAL INTERNAL GRINDING MACHINE WITH GRINDING SPINDLE DIRECTLY ON CROSS SLIDE

[75] Inventors: Kazimierz J. Reda; Victor F. Dzewaltowski, both of Springfield; Richard H. Gile, North Clarendon, all of Vt.

[73] Assignee: Ex-Cell-O Corporation, Troy, Mich.

[21] Appl. No.: 340,410

[22] Filed: Jan. 18, 1982

Related U.S. Application Data

[63] Continuation of Ser. No. 152,286, May 22, 1980, abandoned.

[51] Int. Cl.³ .............................................. G05B 19/24
[52] U.S. Cl. .................................. 318/571; 51/165.71
[58] Field of Search ............... 318/571, 572, 657, 660, 318/661; 51/165.71, 165 TP, 165 R

[56] References Cited

U.S. PATENT DOCUMENTS 3,668,377 6/1972 Inaba et al. ...................... 318/571
3,875,382 4/1975 Cutler ................................. 318/571
3,941,988 3/1976 Hagstrom ........................ 318/571
4,109,185 8/1978 Froyd et al. ....................... 318/571

Primary Examiner—B. Dobeck
Attorney, Agent, or Firm—John C. Evans

[57] ABSTRACT

An electro-mechanical control system for controlling all of the movements of one or more slides on a single workhead grinding machine. A programmable controller is interfaced with a digital to analog converter or feed control which in turn controls a drive motor that is directly connected to a screw actuator means that directly controls the movements and positions of a slide. The positioning accuracy of the control system is derived from the accuracy of the electronic control components and the stability of the machine. The control system can control the operative movements of each slide in a compound slide assembly, simultaneously or independently, for a part of a grinding machine cycle. The compound slide assembly may alternatively carry a rotating grinding wheel or a workhead that is reciprocated at high speed for a grinding operation on a workpiece.

2 Claims, 19 Drawing Figures

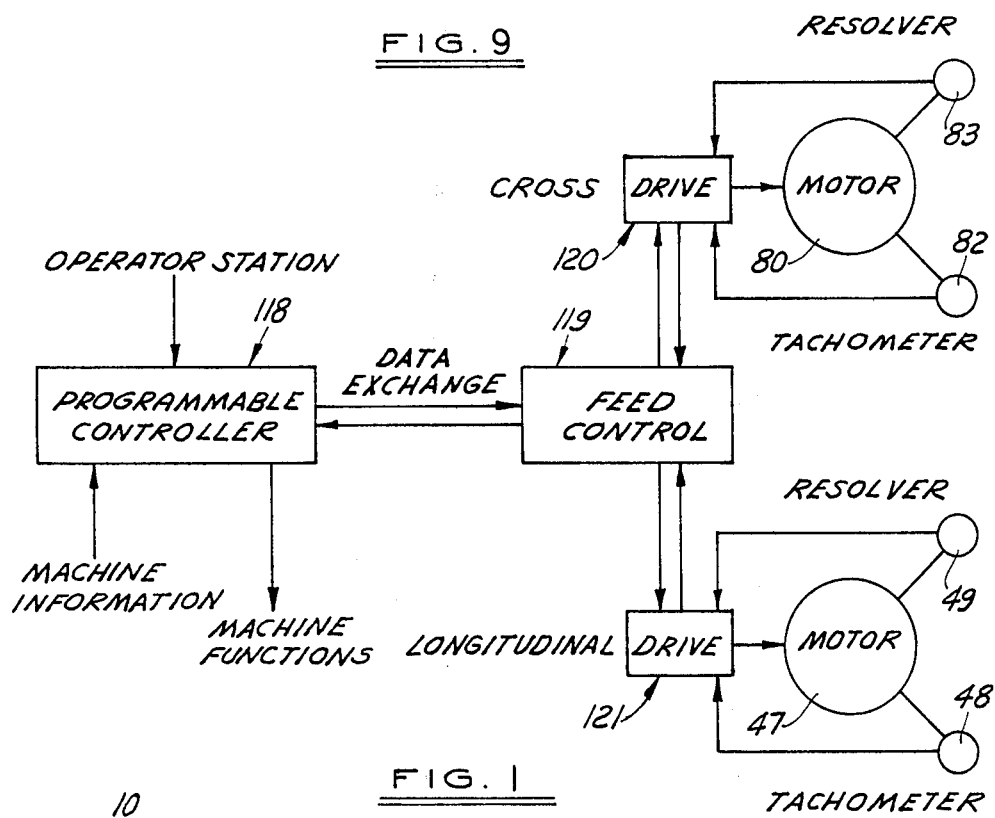
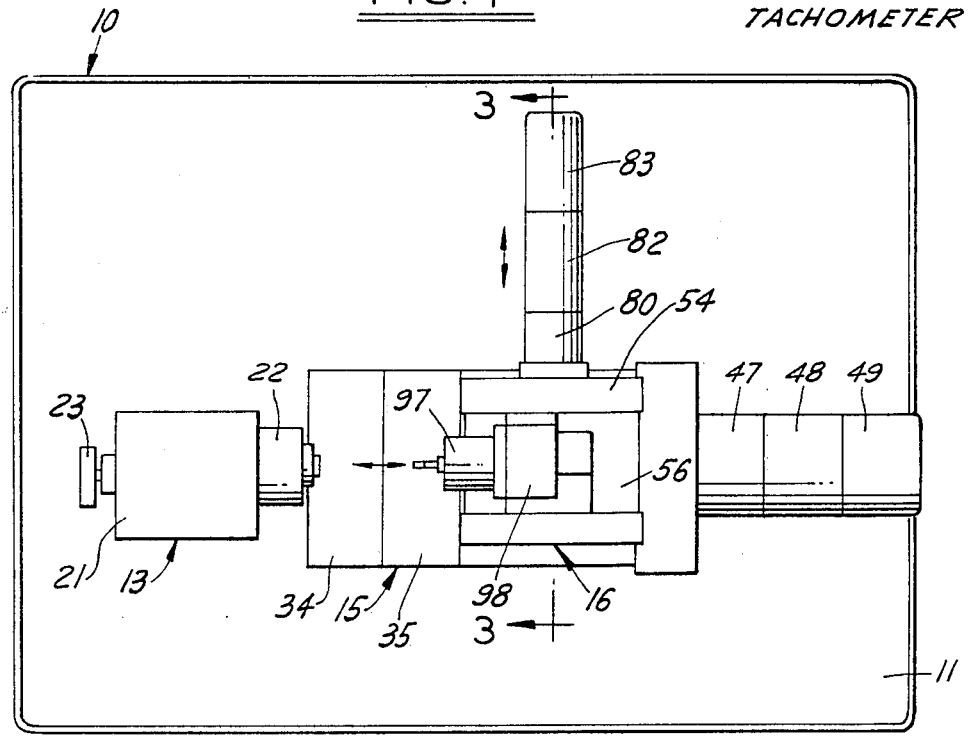

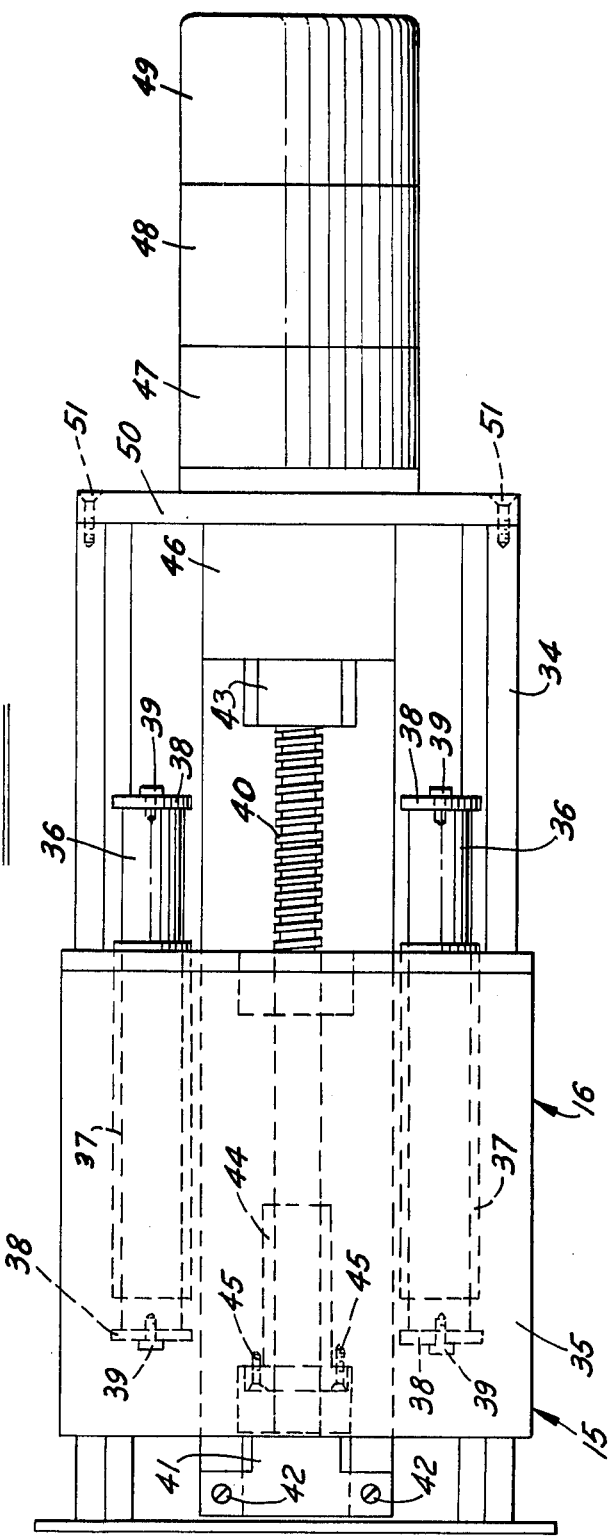

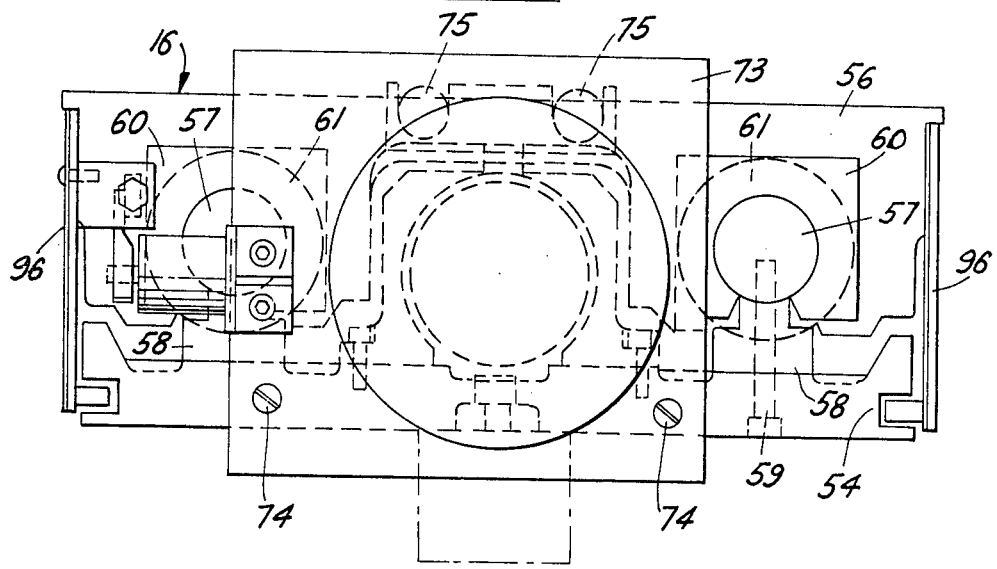
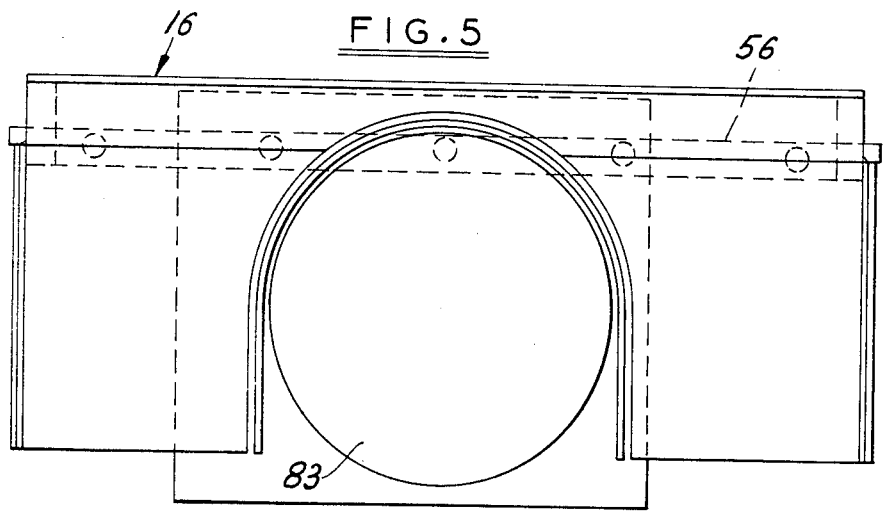

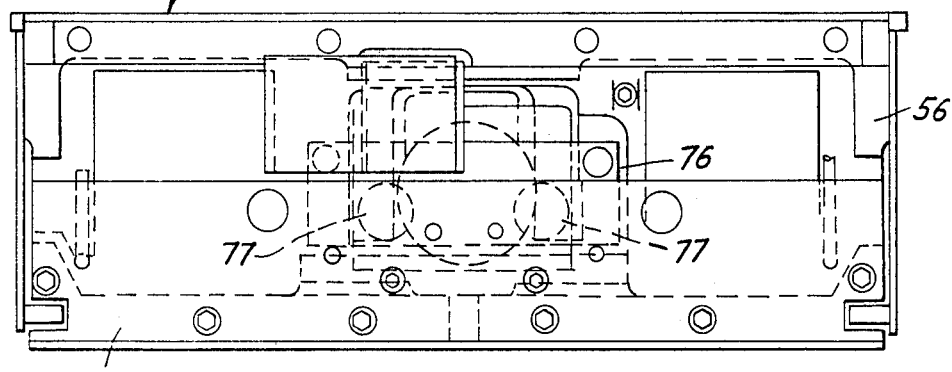
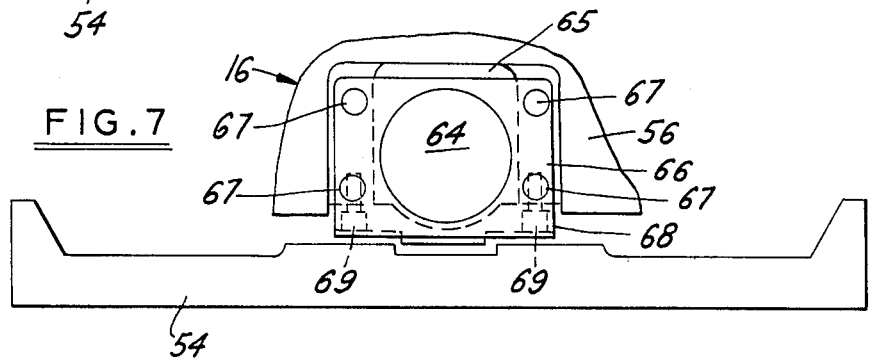
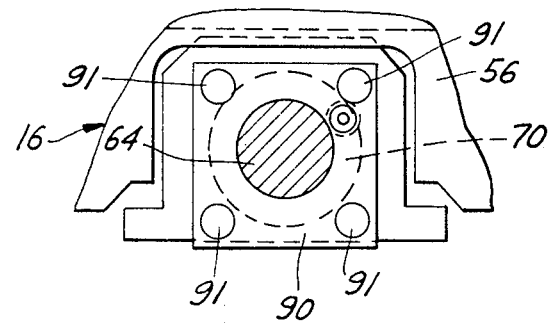

4,419,612

SINGLE WORKHEAD ELECTRO-MECHANICAL INTERNAL GRINDING MACHINE WITH GRINDING SPINDLE DIRECTLY ON CROSS SLIDE

This is a continuation of application Ser. No. 152,286, filed May 22, 1980, now abandoned.

TECHNICAL FIELD

This invention relates generally to the grinding machine art, and more particularly, to an electro-mechanical internal grinding machine. The invention is specifically concerned with a one station electro-mechanical internal grinding machine which has one grinding spindle on a cross slide, and all of the movements of the grinding spindle are electronically controlled.

BACKGROUND ART

It is known in the grinding machine art to employ digital electronic controls to control one parameter or movement along one axis. Such prior art digital electronic controls function through a mechanical advantage to get the positioning accuracy and other tolerances that are required in a grinding operation. Digital electronics is very coarse and it is the mechanical advantage that provides such prior art controls with smoothness and preciseness. It is also known in the grinding machine art to control a second movement along another axis by a cam means or some other mechanical means. In the prior art grinding machines the digital electronics control only a portion of the moves of the grinding machine and not 100% of the moves. For example, the digital electronic controls in the prior art machines control the grind portion or grind movements only, as when the grinding wheel is moved in contact with the workpiece. The prior art grinding machines also have employed various means for controlling machine motions, such as hydraulic cylinders, physical mechanical stops, and adjustable stops to position various grinding machine components. Examples of such prior art grinding machines are grinding machines sold by the Bryant Grinder Corporation, 257 Clinton Street, Springfield, Vt. 05156, and disclosed in U.S. Pat. Nos. 3,932,960; 3,958,370; 4,023,310; 4,058,934 and 4,125,967.

DISCLOSURE OF THE INVENTION

The invention relates to a control system for a grinding machine. The control system includes a digital electronic control apparatus to control 100% of the movements of a grinding machine and a screw actuator means to transmit the control commands from the digital electronic control apparatus into a grinding machine component slide motion. The control system of the present invention is capable of providing complete variable cross slide grinding and stroking conditions, as well as longitudinal slide grinding and stroking conditions. The electronic control apparatus is capable of providing variable reciprocation rates during each stroke of a grinding wheel slide or a workhead slide. The control system of the present invention provides length of stroke, position of stroke, reciprocation rate, and variable reciprocation rates during each stroke. Variations of each of said attributes can be programmed on a finite basis. That is, one set of conditions can be programmed for a rough grind, a second set of conditions during a finish grind and a third set of conditions during spark-out. These conditions can also be programmed to be infinitely variable within the complete grinding cycle and can be managed as individual variables for their individual effect or in combination for their combined effect. By varying these various attributes within a grinding cycle, maximum metal removal conditions can be achieved during one portion of the cycle, while retaining a most desirable combination of attributes to optimize geometry and quality during another portion of the cycle. The control system of the present invention can also control dressing, compensation for dressing, the reciprocation part of the grind cycle, size correction, simultaneous or independent movement of two grinding machine slides, different grinding modes, and other factors.

The invention is illustrated in one embodiment as applied to a one-station electro-mechanical internal grinding machine which includes one grinding wheel spindle on a cross slide. The grinding machine includes a machine base on which is mounted a workhead that is adapted to carry a workpiece. A compound slide is mounted on one end of the machine base in an operative position adjacent the workhead, and it includes a longitudinal slide on which is movably mounted a cross slide that carries an internal grinding wheel spindle.

The illustrative longitudinal and cross slides are each driven by a drive motor which is directly connected to the respective slide by means of a screw actuator means, such as a ball screw, Acme screw, or other means. A programmable controller is programmed with all the required machine information and machine functions so that all of the movements along the longitudinal and cross slide axes are controlled. The programmable controller is operatively connected to a feed control means which in turn is operatively connected to suitable separate servo drive means for each of the drive motors. Each of the drive motors is provided with a tachometer, and a resolver, or encoder, or an "INDUCTOSYN" transducer, for motion control and command signals, respectively.

The accuracy of a grinding operation carried out by a grinding machine provided with the control system of the present invention is controlled by the digital electronics controlling a drive motor which controls a screw actuator means, and which in turn controls a slide directly. There is no mechanical or hydraulic linkage or gearing as is employed in the prior art digital control systems. The positioning accuracy is a result of the accuracy of the control system of the electronic controls and the stability of the machine.

In one illustrative grinding machine embodiment, one workhead rotates a workpiece and a grinding wheel carried by a wheel slide reciprocates on one end of the machine to grind a longitudinal bore in the workpiece.

BRIEF DESCRIPTION OF THE DRAWINGS

FIG. 1 discloses a first illustrative embodiment wherein the control system of the present invention is employed in a schematically illustrated one-station, electro-mechanical internal grinding machine having one grinding wheel spindle on a cross slide.

FIG. 2 is an enlarged plan view of an illustrative longitudinal slide employed in the grinding machine embodiment of FIG. 1.

FIG. 4 is a vertical section view of the structure shown in FIG. 3, taken substantially along the line 4—4 thereof, and looking in the direction of the arrows.

FIG. 5 is a right end view of the structure illustrated in FIG. 3, taken along the line 5—5 thereof, and looking in the direction of the arrows.

FIG. 6 is a left end view of the structure illustrated in FIG. 3, taken along the line 6—6 thereof, and looking in the direction of the arrows.

FIG. 7 is a fragmentary elevation view of the structure illustrated in FIG. 3, taken along the line 7—7 thereof, and looking in the direction of the arrows.

FIG. 8 is a fragmentary, elevation section view of the structure illustrated in FIG. 3, taken along the line 8—8 thereof, and looking in the direction of the arrows.

FIG. 9 is a block diagram of an illustrative control system made in accordance with the principles of the present invention, and shown as applied to the grinding machine illustrated in FIG. 1.

BEST MODE OF CARRYING OUT THE INVENTION

Figure 3:
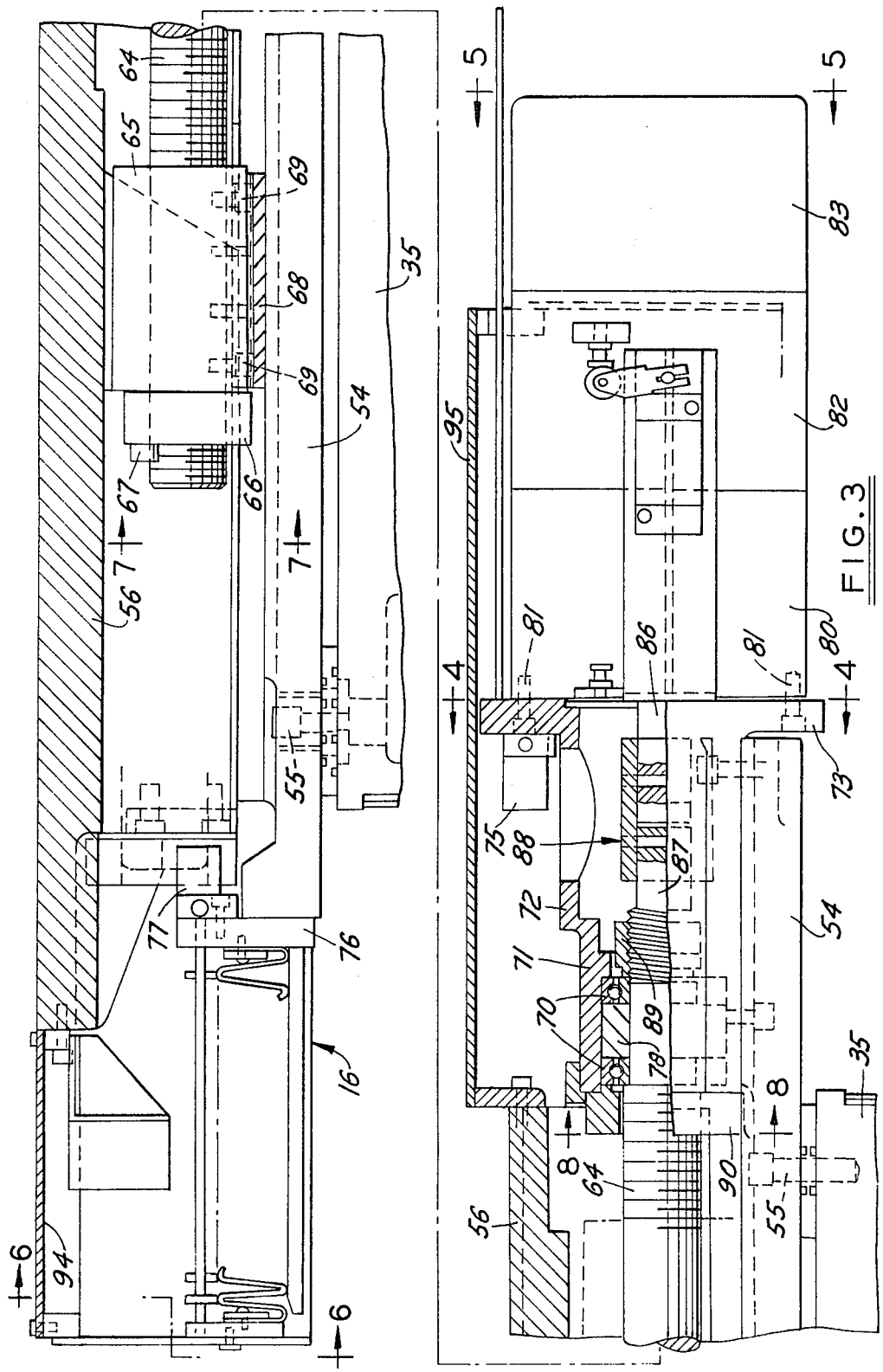
FIG. 3 is a broken, longitudinal section view of an illustrative cross slide employed in the illustrative grinding machine embodiment of FIG. 1, taken substantially along the line 3—3 thereof, and looking in the direction of the arrows.

Referring now to the drawings, and in particular to FIG. 1, the numeral 10 generally designates a one-station electro-mechanical internal grinding machine, with one grinding wheel spindle on a cross slide, made in accordance with the principles of the present invention.

The grinding machine 10 includes a conventional bed or base member 11 on which is operatively mounted a conventional workhead 13. Operatively mounted on the right end of the machine bed 11, as viewed in FIG. 1, is a compound slide assembly comprising a longitudinal slide, generally indicated by the numeral 15, on which is operatively mounted a cross slide, generally indicated by the numeral 16.

The workhead 13 may be of any suitable conventional structure, and it comprises a chucking fixture 22 for holding a workpiece. The chucking fixture 22 may be of the centerless type and be rotated by the motor 13 and an operatively connected pulley means, schematically indicated by the numeral 23.

As shown in FIG. 1, a bore grinding wheel 29 is operatively carried on the compound slide assembly, on the right end of the machine 10, which comprises the longitudinal slide 15 and the cross slide 16. It will be understood that the control system of the present invention is capable of controlling any combination of motions of a grinding wheel on the compound slide assembly.

FIG. 2 illustrates the general structural layout of the longitudinal slide 15. The numeral 34 designates a conventional slide base which is integral with the machine bed 11. Slidably mounted on the integral slide base 34 is a conventional slide 35. The slide 35 is slidably mounted on the slide base 34 by a pair of laterally spaced apart conventional ball slide bars 36 which are fixedly secured to the integral slide base 34 in the same manner as hereinafter described for the ball slides for the cross slide 16, but which last mentioned ball slides are secured to a separate slide base. The slide bars 36 are provided with stop plates 38 on each end thereof which are secured to the slide bars 36 by suitable machine screws 39. The slide 35 is slidably mounted on the slide bars 36 by suitable conventional ball slide sleeves 37 which carry balls in a conventional manner for rollably supporting the slide 35 on the bars 36. Although the illustrative embodiment employs a ball slide for the longitudinal slide 15, it will be understood that any suitable slide system may be employed, as for example a roller slide system, a hydrostatic slide system, a hydrodynamic slide system, or the like.

The slide 35 is moved on the slide bars 36 by a conventional ball screw, Acme screw, or other screw means 40 which has one end rotatably mounted in a suitable bearing means carried in a bearing block 41. As shown in FIG. 2, the bearing block 41 is fixedly secured to the integral slide base 34 by any suitable means, as by suitable machine screws 42. The slide 35 is operatively connected to the ball screw, Acme screw or other screw means 40 by a screw nut 44 which is fixed to the slide 35 by any suitable means, as by suitable machine screws 45. The other end of the ball screw, Acme screw, or other screw means 40 is rotatably supported by a suitable bearing means carried in a bearing block 43 that is integrally formed with a coupling housing 46 which is also integrally formed with a motor mount plate 50. The motor mount plate 50 is fixedly secured to the integral slide base 34 by any suitable means, as by suitable machine screws 51. The motor mount plate 50 operatively supports a suitable reversible electric drive motor 47 which has operatively mounted thereon a conventional tachometer 48 and a conventional resolver, encoder, or "INDUCTOSYN" (a trademark) transducer 49.

FIGS. 3 through 8 illustrate the general structural layout of the cross slide 16. As best seen in FIG. 3, the numeral 54 designates the conventional cross slide base which is fixedly secured to the longitudinal slide base 35 by any suitable means, as by suitable machine screws 55. Slidably mounted on the cross slide base 54 is a conventional cross slide carriage 56. The cross slide carriage 56 is slidably mounted on the cross slide base 54 by a pair of laterally spaced apart conventional ball slides comprising a pair of parallel slide bars 57 (FIG. 4) which are each mounted on a support rail 58. Although the illustrative embodiment employs a ball slide for cross slide 16, (shown in FIG. 1), it will be understood that any suitable slide system may be employed, as for example, a roller slide system, a hydrostatic slide system, a hydrodynamic slide system, or the like. The slide bars 57 and the support rails 58 are fixedly secured to the cross slide base 54 by a plurality of suitable machine screws 59 (FIG. 4). The slide bars 57 are provided with fixedly mounted stop plates 60 on each end thereof. The slide carriage 56 is slidably mounted on the slide bars 57 by suitable conventional ball slide sleeves 61 (FIG. 4) which carry balls in a conventional manner for rollably supporting the slide carriage 56 on the slide bars 57.

The cross slide carriage 56 is moved on the slide bars 57 by a conventional ball screw, Acme screw, or other screw means 64 which has one end rotatably mounted through a conventional ball screw nut 65 (FIGS. 3 and 7). The ball screw nut 65 is fixedly secured to the cross slide carriage 56 by an integral mounting plate 66 and suitable machine screws 67. The ball screw nut 65 includes a lower retainer plate 68 (FIG. 7) which is secured to the cross slide carriage 56 by a plurality of suitable machine screws 69.

The other end of the ball screw 64 is rotatably supported by suitable bearings 70, which are spaced apart by a spacer member 78. The bearings 70 and spacer member 78 are carried in a bearing housing 71 (FIG. 3) that is integrally formed with a coupling housing 72 which is also integrally formed with a motor mount plate 73. The motor mount plate 73 is fixedly secured to the cross slide base 54 by any suitable means, as by suitable machine screws 74 (FIG. 4). Suitable slide carriage rear bumpers 75 (FIGS. 3 and 4) are fixedly mounted on the inner side of the motor mount plate 73. Suitable slide carriage forward bumpers 77 are fixedly mounted on a plate 76 carried on the forward end of the cross slide base 54.

As illustrated in FIG. 3, a suitable reversible electric drive motor 80 is fixedly secured by any suitable means, as by suitable machine screws 81, to the motor mount plate 73. The drive motor 80 is of the same construction as the longitudinal drive motor 47, and it has operatively mounted thereon a conventional tachometer 82, and a conventional resolver, encoder, or "INDUCTOSYN" (a trademark) transducer 83.

As illustrated in FIG. 3, the output shaft 86 of the drive motor 80 is directly connected to the adjacent end 87 of the ball screw shaft 64 by a suitable coupling, generally indicated by the numeral 88. As illustrated in FIG. 3, the bearings 70 are retained in the housing 71 by a suitable lock nut 89 on one end of the housing 71 and a retainer plate (FIG. 8) 90 on the other end of the housing 71. The retainer plate 90 is secured to the housing 71 by suitable machine screws 91 (FIG. 8). As illustrated in FIG. 3, the slide carriage 56 may be provided with suitable top cover plates 94 and 95 on the front and rear ends, respectively. As illustrated in FIG. 4, the slide carriage 56 may also be provided with side cover plates 96. As illustrated in FIG. 1, a conventional grinding wheel spindle 97 is operatively mounted on the cross slide carriage 56 and it has operatively attached thereto the bore grinding wheel 29. The grinding wheel spindle 97 is driven by a suitable electric drive motor 98 which is also operatively mounted on the cross slide carriage 56.

FIG. 9 is a block diagram of a control system made in accordance with the principles of the present invention, and shown as employed to control the aforedescribed first embodiment of a one-station grinding machine 10.

In FIG. 9, the numeral 118 generally designates a separate, conventional programmable controller which is programmed to control all machine functions and interlocks. Such functions include lubrication status, safety interlocks, loader position, motor status and operation control station information. The programmable controller determines from the machine status which sequence the slides are to move through next. The programmable controller 118 is interfaced electronically with a suitable feed control 119 which may be any suitable digital computer. The feed control 119 has stored the positions and rates for all the axis moves for the various sequences. The sequences may be a dress cycle, a grind cycle, a new wheel dress cycle, and so forth. The feed control gives signals to the drive means 120 and 121 and they control the servo motors 80 and 47, respectively. The drive means 120 and 121 take feedback from the tachometer 82 and 48, respectively. The numerals 83 and 49 designate either resolvers, encoders or "INDUCTOSYN" transducers (a trademark), and they provide feedback signals to the drive means 120 and 121, respectively.

Any suitable programmable controller 118 may be employed, such as a Bryant Series 75 programmable controller available from the Westinghouse Electric Corporation of Gateway Center, Pittsburgh, Pa. 15222. A suitable feed control 119 is one available on the market from Intel Corporation of Santa Clara, Calif. 95054, and which is sold under the name of "INTEL", (a trademark), 80/05 Single Board Computer. The drive means 120 and 121 may be any suitable servo drive means as, for example, a servo drive available on the market from Hyper Loop, Inc., of 7459 W. 79 Street, Bridgeview, Ill. 60455, under the trademark "HYAMP". The "HYAMP" servo drive is a single-phase, full wave, bi-directional SCR servo drive for D.C. motors, and it provides D.C. drive power for precise speed control and regulation over a wide speed range. Another suitable servo-drive, designated as Size 50, is available from General Electric Company, 685 West Rio Road, Charlottsville, Va. 22906.

The drive motors 47 and 80 may be any suitable D.C. servo motors. Suitable D.C. servo motors of this type are available from Torque Systems Incorporated, 225 Crescent St., Waltham, Mass. 02154, under the trademark "SNAPPER", and identified as frame sizes 3435 and 5115. A larger motor of this type is also available from the H. K. Porter Co., of 301 Porter St., Pittsburgh, Pa. 15219.

The tachometers 48 and 82 are part of the D.C. servo motors. The resolvers, encoders or "INDUCTOSYN" transducers 49 and 83 are conventional items, and they may be any suitable conventional position feedback devices available on the market. Resolvers of this type are available from the Clifton Precision Company of Clifton Heights, Pa. 19018. "INDUCTOSYN" precision linear and rotary position transducers are available from Farrand Controls, a division of Farrand Industries, Inc., of 99 Wall Street, Valhalla, N.Y. 10595. A suitable optical shaft angle encoder, designated by Model No. DRC-35 is available fron Dynamics Research Corporation of 60 Concord Street, Wilmington, Mass. 01887.

In operation, the bore grinding wheel 29 is rotated normally at a speed of from 30,000 to 40,000 revolutions per minute, but it may be rotated at a speed of up to 150,000 revolutions per minute. Assuming that the operator has actuated the necessary controls at the operator station, the programmable controller 118 takes over and controls all of the programmed machine functions. The longitudinal slide 15 provides the rotating gringing wheel 29 with a sequence of movements such as rapid forward traverse, slow infeed, high speed reciprocation and back-off or retraction. The cross slide 16 provides the grinding wheel 29 with positioning movements and compensation movements to compensate for the wearing away of the grinding wheel in the grinding of each part. The control system of the present invention is so accurate that compensation movements of ten millionths of an inch may be carried out to maintain an extremely high accuracy within a plus or minus ten millionths of an inch.

After the programmed grinding operations have been carried out by the grinding wheel 29, it is retracted and the finished workpiece is removed from the workhead 13 and a new workpiece is loaded into the workhead 13. The grinding machine 10 may be provided with any suitable parts loading and unloading apparatus, gaging apparatus, and so forth. It will be seen that each axis of the machine 10 can function independently of the other axis to carry out its programmed work. The axes are coordinated where necessary to assure the proper operation. For example, in a bore grind, the longitudinal slide must be in position and reciprocate before the cross slide can start the grind operation.

As stated hereinbefore, the motor 47 moves the longitudinal slide 15 and the rotating grinding wheel 29 through a sequence of motions which include rapid forward traverse to move the grinding wheel 29 to a point adjacent a workpiece, and then a slow infeed of the grinding wheel 29 to a position inside of the workpiece. The motor 47 then provides the longitudinal slide and grinding wheel 29 with a rapid axial reciprocation to carry out the grinding part of the grinding cycle on a bore in a workpiece. The motor 80 moves the cross slide carriage 56 to bring the grinding wheel 29 into engagement with the bore of the workpiece for a finish grind. The axial reciprocation of the grinding wheel 29 is effected by the screw 40 and the motor 47 under the control of the feed control 119 of the control circuit of FIG. 9. The physical movement or reciprocation is carried out by the motor 47. The intelligence to move the motor 47 is provided by the information supplied by the feed control 119, which goes to the drive 121 to tell it how fast to move the motor 47. The feedback information goes back into the drive 121 and tells the computer how far the grinding wheel 29 has moved, and the computer keeps track of how far the grinding wheel 29 is programmed to go, and how far it has moved. After the high speed reciprocation part of the grinding cycle is completed, according to the machine programming, the motors 80 and 47 are then controlled to retract the grinding wheel 29 to its inoperative position.

It will be seen that the present invention provides a means for controlling the axial reciprocation part of a grind cycle with the same motor 47 and screw actuator means 40 as is used for other movements of the longitudinal slide along its axis. It will also be seen that the present invention provides a grinding machine with means to accomplish compensation in the position of the grinding wheel 29 after it has been dressed, by the same screw actuator means 64 and motor 80 as is used to provide other movements of the slide carriage 56 along the same axis. The present invention also provides size correction to the position of the grinding wheel 29 by the same screw actuator means and motor means employed for other movements along both the cross or lateral axis.

It will be seen that just as the motors 47 and 80 with appropriate controls can grind a bore with the side of grinding wheel 29, the roles of the motors can be reversed to allow for reciprocation with motor 80 and grind feed, compensation for wheel wear and size correction through motor 47. This will cause the face of a part to be ground with the end of the grinding wheel 29. It will also be seen that a number of bores and faces can be ground on the same workpiece or part through proper coordination of the moves of the two motors 47 and 80.

It will be seen that just as motors 47 and 80, with appropriate controls, can grind a bore with the side of a grinding wheel 29, they can also grind an external surface concentric with the bore, with the same controls, with only the positions being offset by a fixed distance.

Figure 10:
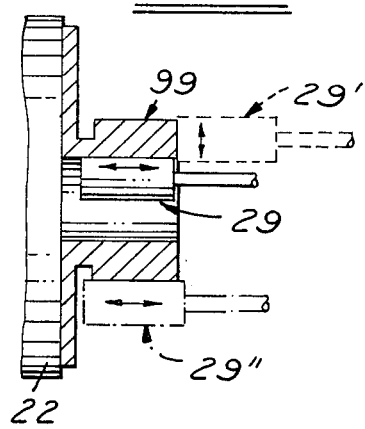
FIG. 10 is a schematic illustration of a sequence of grinding operations capable of being carried out on a workpiece in a single workhead, by a single grinding wheel, with the grinding machine structure illustrated in FIGS. 1 through 8 and the control means illustrated in FIG. 9.

FIG. 10 is a schematic illustration of a sequence of grinding operations which are capable of being carried out on a workpiece in a single workhead by a single rotatable grinding wheel, with the grinding machine structure illustrated in FIGS. 1 through 8, and as controlled by the control means illustrated in FIG. 9. In FIG. 10 the workpiece fixture 22 is illustrated as operatively holding a workpiece, generally indicated by the numeral 99. The rotatable grinding wheel 29 is illustrated as carrying out a bore grinding operation on the workpiece 99. The numeral 29' illustrates the rotatable grinding wheel 29 in a different operative position for carrying out a face grinding operation on the workpiece 99. The numeral 29' shows the rotatable grinding wheel 29 in another operative position for carrying out an external or peripheral grinding operation on the workpiece 99. It will be understood that the bore, face and external grinding operations illustrated in FIG. 10 would be carried out sequentially by the control means illustrated in FIG. 9, in a desired programmed sequence.

Figure 11:
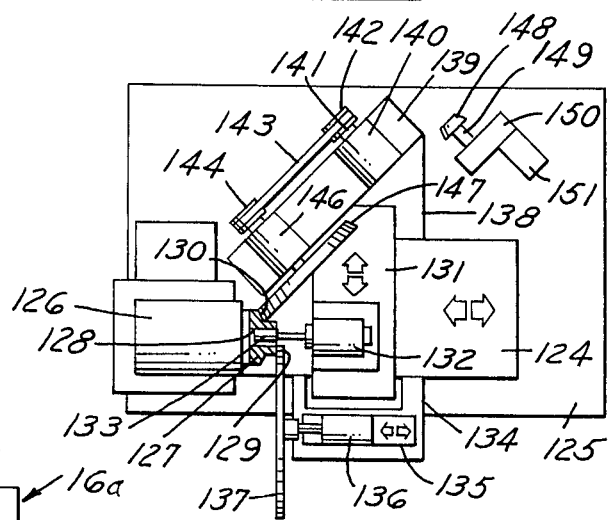
FIG. 11 is a schematic illustration of a plurality of grinding operations capable of being carried out simultaneously by a single workhead grinding machine employing the basic grinding machine structure illustrated in FIGS. 1 through 8 and the control means illustrated in FIG. 9, together with added slide structures.

FIG. 11 is a schematic illustration of a plurality of grinding operations capable of being carried out simultaneously by a single workhead grinding machine employing the basic grinding machine structure illustrated in FIGS. 1 through 8 and the control means illustrated in FIG. 9, together with added slide structure. In FIG. 11, the numeral 125 designates a grinding machine bed on which is operatively mounted a single workhead 126. The workhead 126 is provided with a suitable workpiece fixture that carries a workpiece 127 that is rotated by the workhead 126. The workpiece 127 is provided with a bore 128, a transverse end face 129, and a tapered shoulder face 130. The grinding machine structure illustrated in FIG. 11 is adapted to simultaneously carry out a bore grinding operation on the bore 128, a face grinding on the end face 129, and a face grinding on the tapered shoulder face 130.

The grinding machine of FIG. 11 includes a compound slide assembly which comprises a longitudinal slide 124 and a cross slide 131. The slides 124 and 131 correspond to the longitudinal and cross slides 15 and 16, respectively, of the embodiment of FIG. 1. A rotatable grinding wheel head 132 is operatively carried on the cross slide 131, and it is provided with a grinding wheel 133 for performing a bore grinding operation in the bore 123 in the workpiece 127. A suitable bracket 134 is fixedly secured, by any suitable means, to one side of the longitudinal slide 124, and it carries a second longitudinal slide 135 which is positioned on another axis parallel to the axis of the first longitudinal slide 124. The second longitudinal slide 135 carries a rotatable grinding wheel head 136 which is provided with a rotatable grinding wheel 137 that simultaneously carries out a face grinding operation on the workpiece end face 129 while the bore grinding operation is carried out by the rotatable grinding wheel 133 in the bore 128.

The first longitudinal slide 124 is also provided on the other side thereof with a suitable bracket 138 for carrying an angularly disposed, third longitudinal slide 139. Operatively mounted on the slide 139 is a suitable drive motor 140 which has an output shaft 141 on which is mounted a drive pulley 142. The drive pulley 142 drives a belt 143 which is mounted around a driven pulley 144 carried on a shaft 145 of a grinding wheel spindle 146. The grinding wheel spindle 146 operatively carries a rotatable grinding wheel 147 which has an angled periphery that is complementary to the angular shoulder face 130 on the workpiece 127. The grinding wheel 147 is controlled so as to carry out the face grinding operation on the workpiece angled shoulder face 130 simultaneously with the face grinding operation on the workpiece face 128 and the grinding operation on the workpiece bore 128.

A suitable diamond roll dresser motor 151 is operatively mounted on the machine bed 125, and it drives a gear reducer 150 which has an output shaft 149 that carries a diamond roll dresser 148. The angular slide 139 is adapted to back the grinding wheel 147 to an operative dressing position against the rotatable diamond roll dresser 148 in a conventional manner. It will be understood that the grinding machine of FIG. 11, with its two longitudinal slides 124 and 135 and the one angular longitudinal slide 139 would be controlled by a control system, embodying the principles of the control system of FIG. 9, for providing the aforedescribed simultaneous bore and two face grinding operations.

Figure 12:
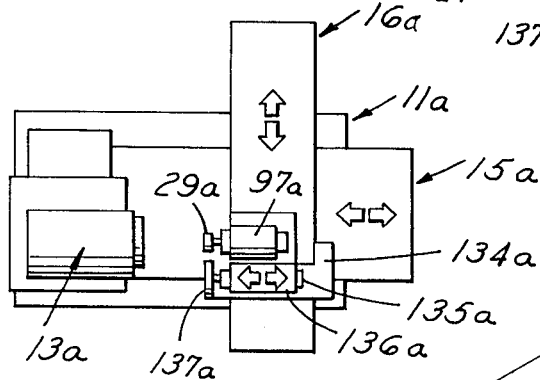
FIG. 12 is a schematic illustration of a single workhead grinding machine, made in accordance with the principles of the present invention, and wherein a longitudinal slide carries a cross slide on which is operatively mounted a grinding wheel that may carry out a bore grind operation, and wherein a second slide is operatively mounted on the longitudinal slide for carrying out a face grind operation.

FIG. 12 is a schematic illustration of a single workhead grinding machine made in accordance with the principles of the present invention, and wherein a compound slide assembly carries a grinding wheel that is adapted to carry out a bore grinding operation, and wherein a second longitudinal slide is operatively mounted on the first longitudinal slide of the compound slide assembly for carrying out a face grinding operation simultaneously with the bore grinding operation. The structure of the grinding machine illustrated in FIG. 12 which is the same as the structure of the grinding machines illustrated in the embodiments of FIGS. 1 and 11 have been marked with the same reference numerals followed by the small letter "a".

The rotatable grinding wheel 29a is carried on the cross slide 16a and it is adapted to carry out a bore grinding operation on a workpiece rotatably supported on a workhead 13a. A rotatable grinding wheel 137a is adapted to simultaneously carry out a face grinding operation on the last mentioned workpiece. The rotatable grinding wheel 137a is operatively carried by a grinding wheel head 136a which is operatively mounted on a longitudinal slide 135a, which in turn is carried on a bracket 134a that is fixed to the longitudinal slide 15a. The movements of the longitudinal slide 15a and the cross slide 16a would be controlled by a control system as employed for the embodiment of FIG. 1.

Figure 13:
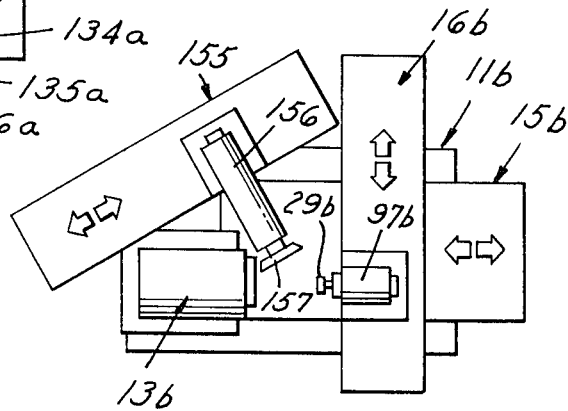
FIG. 13 is another embodiment of a single workhead grinding machine made in accordance with the principles of the present invention, and which includes the longitudinal and cross slide structures of FIG. 1, together with an angularly disposed longitudinal slide that carries a grinding wheel for carrying out a simultaneous face operation.

FIG. 13 is a schematic illustration of a single workhead grinding machine, made in accordance with the principles of the present invention, and which includes the combination slide assembly of the embodiment of FIG. 1, together with an angularly disposed longitudinal slide 155 that carries a rotatable grinding wheel 157 for carrying out a face grinding operation on a workpiece. The structure of the grinding machine illustrated in FIG. 13 which is the same as the structure of the grinding machine illustrated in FIG. 1, have been marked with the same reference numerals, followed by the small letter "b". The rotatable grinding wheel 29b is adapted to carry out a bore grinding operation on a workpiece supported by a suitable rotatable workpiece fixture carried by the workhead 13b. The longitudinal slide 155 is angularly disposed on the left end of the machine bed 11b, and it carries a rotatable grinding wheel head 156 that operatively supports and drives the rotatable grinding wheel 156. The movements of the longitudinal slide 15b and the cross slide 16b, of the compound slide on the right end of the machine bed 11b, as well as the angular slide 155 would be controlled by a control system embodying the principles of the control system of FIG. 9.

Figure 14:
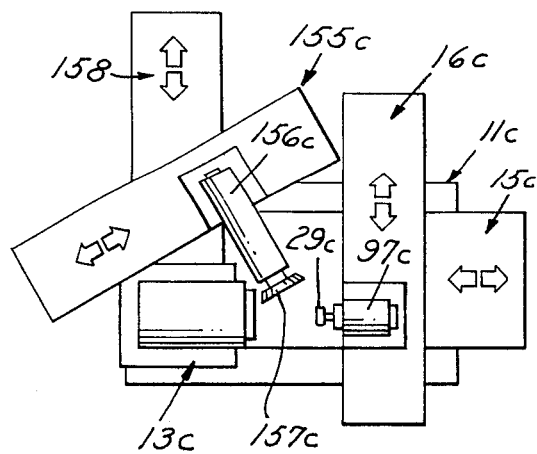
FIG. 14 is still another embodiment of a single workhead grinding machine made in accordance with the principles of the present invention, and which includes the grinding machine structure illustrated in FIG. 13, and wherein the angularly disposed longitudinal slide is operatively mounted on a cross slide.

FIG. 14 is a schematic illustration of another embodiment of a single workhead grinding machine made in accordance with the principles of the present invention, and which includes the grinding machine structure illustrated in FIG. 13, with an additional cross slide 158 for carrying the angular slide shown in FIG. 13. The structure of the grinding machine illustrated in FIG. 14, which is the same as the structure of the grinding machine illustrated in FIG. 13, has been marked with the same reference numerals, followed by the small letter "c". The grinding machine illustrated in FIG. 14 is adapted to carry out the same bore grinding and face grinding operations accomplished by the embodiment of FIG. 13, with the additional control feature of the adjustability of slide 155c by the means of cross slide 158. The compound slide assemblies employed in the embodiment of FIG. 14 would be controlled by a control system embodying the principles of the control system of FIG. 9.

Figure 15:
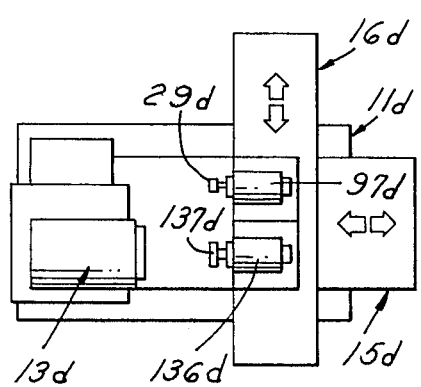
FIG. 15 is a further embodiment of a single workhead grinding machine made in accordance with the principles of the present invention, and which includes the longitudinal and cross slide structures of FIG. 1, together with a second grinding wheel carried on the cross slide for sequentially carrying out a face grind operation.

FIG. 15 is a further embodiment of a single workhead grinding machine, made in accordance with the principles of the present invention, and which includes the compound slide assembly of FIG. 1, together with a second grinding wheel mounted on the cross slide of the compound slide assembly for sequentially carrying out a bore grinding operation and a face grinding operation. The structure of the grinding machine illustrated in FIG. 15, which is the same as the structure of the grinding machines illustrated in FIGS. 1 and 12, have been marked with the same reference numerals, followed by the small letter "d". The movements of the longitudinal slide 15d and the cross slide 16d would be controlled by a control system employing the principles of the control system of FIG. 9, for adjusting the position of the grinding wheels 29a and 137a, to sequentially carry out a bore grinding operation and a face grinding operation, respectively.

Figure 16:
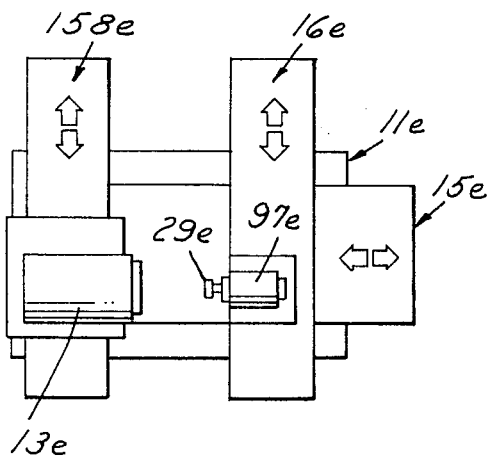
FIG. 16 is still a further embodiment of a single workhead grinding machine made in accordance with the principles of the present invention, and which includes the longitudinal and cross slide structures of FIG. 1, together with a cross slide that carries the single workhead.

FIG. 16 is still a further embodiment of a single workhead grinding machine made in accordance with the principles of the present invention, and which includes the compound assembly of FIG. 1, together with a cross slide that carries a single workhead. The structure of the grinding machine illustrated in FIG. 16, which is the same as the structure of the grinding machines illustrated in FIGS. 1 and 14, have been marked with the same reference numerals, followed by the small letter "e". The grinding machine illustrated in FIG. 16 is adapted to carry out the same bore grinding operation as the embodiment of FIG. 1, with the additional control feature of the adjustability of the workhead 13e, which is carried on the cross slide 158e. The compound slide structure employed in the embodiment of FIG. 14, and the workhead cross slide 158e, are controlled by a control system embodying the principles of the control system shown in FIG. 9.

Figure 17:
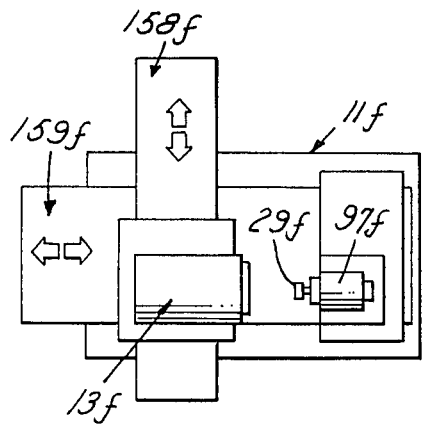
FIG. 17 is still another embodiment of a single workhead grinding machine made in accordance with the principles of the present invention, and wherein the structure of FIG. 1 is reversed, with the grinding wheel being fixed on the machine bed and the workhead being mounted on a cross slide that is carried on a longitudinal slide.

FIG. 17 is still another embodiment of a single workhead grinding machine made in accordance with the principles of the present invention, and wherein the structure of FIG. 1 is reversed, with the grinding wheel head 97f being fixed on the machine bed 11f, and the workhead 13f being mounted on the cross slide 158f of a compound slide assembly including a longitudinal slide 159. The structure of the grinding machine illustrated in FIG. 17, which is the same as the structure of the grinding machines illustrated in FIGS. 1 and 16, have been marked with the same reference numerals followed by the small letter "f". The grinding machine illustrated in FIG. 17 is adapted to carry out the same bore grinding operation as the embodiment of FIG. 1, with the reverse control feature of the adjustability of the workhead 13f. The compound slide structure carrying the workhead 13f in the embodiment of FIG. 17 would be controlled by a control system embodying the principles of the control system shown in FIG. 9.

Figure 18:
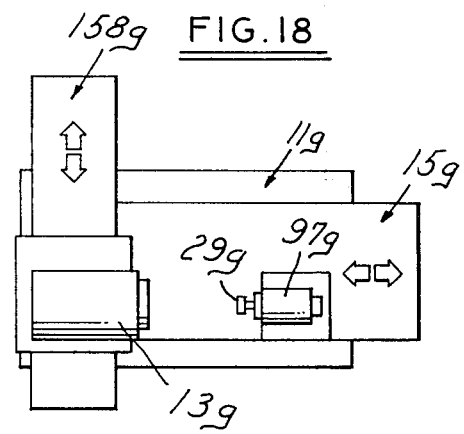
FIG. 18 is a further embodiment of a single workhead grinding machine made in accordance with the principles of the present invention, and wherein a single grinding wheel is carried on a longitudinal slide and a single workhead is carried on a cross slide.

FIG. 18 is a further embodiment of a single workhead grinding machine made in accordance with the principles of the present invention, and wherein a single grinding wheel head 97g is carried on a longitudinal slide 15g, and a single workhead 13g is carried on a cross slide 158g. The structure of the grinding machine illustrated in FIG. 18, which is the same as the structure of the grinding machines illustrated in FIGS. 1 and 16, have been marked with the same reference numerals, followed by the small letter "g". The grinding machine illustrated in FIG. 18 is adapted to carry out the same bore grinding operation as the embodiment of FIG. 1, with the control features of the longitudinal adjustability of the grinding wheel 19g, and the transverse or cross adjustability of the workhead 13g. The longitudinal slide 15g and the cross slide 158g of the embodiment of FIG. 18 would be controlled by a control system embodying the principles of the control system shown in FIG. 9.

Figure 19:
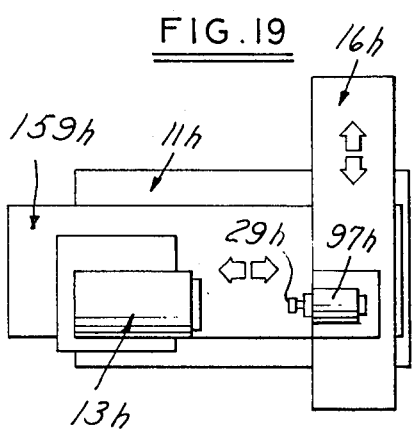
FIG. 19 is still another embodiment of a single workhead grinding machine made in accordance with the principles of the present invention, and showing a structure reverse to that of FIG. 18, wherein the grinding wheel is mounted on a cross slide and the workhead is mounted on a longitudinal slide.

FIG. 19 is still another embodiment of a single workhead grinding machine, made in accordance with the principles of the present invention, and showing a structure reverse to that of FIG. 18, wherein a grinding wheel head 97h is mounted on a cross slide 16h, and a workhead 13h is mounted on a longitudinal slide 159h. The structure of the grinding machine illustrated in FIG. 19, which is the same as the structure of the grinding machines illustrated in FIGS. 1 and 16 have been marked with the same reference numerals followed by the small letter "h". The grinding machine illustrated in FIG. 19 is adapted to carry out the same bore grinding operation as the embodiment of FIG. 1, with the control features of the longitudinal adjustability of the workhead 13h and the transverse or cross adjustability of the grinding wheel head 97h. The longitudinal slide 159h and the cross slide 16h of the embodiment of FIG. 19 would be controlled by a control system embodying the principles of the control system shown in FIG. 9.

INDUSTRIAL APPLICABILITY

The control system of the present invention is adapted to control all of the movements of both slides in a compound slide assembly for a grinding machine. All of the movements of one compound slide assembly can be controlled simultaneously, or independently, by the electronic control system of the invention. All of the grinding machine functions and positions are controlled by the electronic control system through a screw actuator means.

We claim:

1. A method for controlling the position and movement of a grinding wheel and spindle in a single workhead grinding machine with two slide means establishing the relative position between a rotating workpiece and the grinding wheel with the slide means being driven by first and second electric motor driven screw actuator means along first and second axes arranged perpendicular to one another and with one of the first and second axes being on the same axis as the axis of rotation of the grinding wheel spindle comprising:

(a) programming a programmable computer with first and second sets of data to control the position and drive speed of a slide means to establish the relative position and relatively velocity of movement between a grinding wheel and a rotating workpiece;

(b) interfacing an electronic feed control means with the programmable controller and an electric motor servo controller means;

(c) controlling the speed and position of the slide means by speed sensing and closed loop control of a single servo loop for the speed and position of movement of each of first and second electric motor driven screw actuator means; and (d) controlling the first electric motor driven actuator means to control directional movement and speed of the slide means along the same axis as the axis of rotation of a grinding wheel spindle to adjust the relative position and relative velocity of movement of the grinding wheel and slide means at a grinding position and between a workpiece grinding position and a retract position;

(e) said last mentioned controlling step including providing simultaneous coarse and fine resolution of movement of the slide solely by the closed loop control of said first electric motor driven actuator means by one of the single servo loops.

2. An electro-mechanical system constituting the sole means for controlling all of the relative movements between a rotatable workpiece in a single workhead grinding machine and a spindle connected to a grinding wheel, the machine including a multiple axis slide means comprising:

(a) programmable controller means for presetting first and second sets of data to control the position and drive speed of the slide means;

(b) feed control computer means for producing servo-drive signals in accordance with said sets of data;

(c) means for interfacing said programmable controller means with said feed control computer means;

(d) first and second electric motor driven screw actuator means connected to said slide means for driving said slide means in a first direction axially of the axis of rotation of the spindle and in a direction transverse to said first direction;

(e) servo means for interfacing said feed control computer means and said electric motor driven screw actuator means and including first position feed-back means and first speed feed-back means for controlling directional movement and speed of the slide means along the same axis as the axis of rotation of the spindle to cause the grinding wheel and slide means to be relatively positionable between a workpiece grinding position and a retract position;

(f) said servo means further including second position feedback means and second speed feedback means for controlling directional movement and speed of the slide means in a direction transverse to the axis of rotation of the spindle when the grinding wheel is in said workpiece grinding position;

(g) said servo means constituting the sole means for resolving movement of said slide means; said servo controlled first and second electric driven screw actuator means producing simultaneous control of coarse and fine movements of said slide means.

* * * * *